United States Patent [19]

Koshida

[11] Patent Number: 4,845,770
[45] Date of Patent: Jul. 4, 1989

[54] METHOD AND APPARATUS FOR PROCESSING EMBOSSED CARD

[75] Inventor: Yoshinori Koshida, Tokyo, Japan

[73] Assignee: Oki Electric Industry Co., Ltd., Tokyo, Japan

[21] Appl. No.: 122,196

[22] Filed: Nov. 18, 1987

[30] Foreign Application Priority Data

| Nov. 20, 1986 | [JP] | Japan | 61-275160 |
| Nov. 21, 1986 | [JP] | Japan | 61-276714 |
| Jan. 23, 1987 | [JP] | Japan | 62-13672 |

[51] Int. Cl.⁴ .............................................. G06K 9/00
[52] U.S. Cl. ..................................... 382/65; 382/66; 235/448; 250/555
[58] Field of Search ............... 382/59, 65, 66, 67, 382/68, 8; 235/448; 250/555

[56] References Cited

U.S. PATENT DOCUMENTS

| 3,611,292 | 10/1971 | Brown et al. ......................... 382/65 |
| 3,627,991 | 12/1971 | Beall et al. ........................... 235/448 |
| 3,786,238 | 1/1974 | Heisner ................................ 250/227 |
| 3,814,905 | 6/1974 | Lawrence et al. ................... 235/448 |
| 3,937,928 | 2/1976 | Sasaki et al. ......................... 250/566 |
| 4,020,327 | 4/1977 | Geary et al. .......................... 382/66 |
| 4,700,078 | 10/1987 | Mizuno et al. ........................ 382/65 |
| 4,727,419 | 2/1988 | Yamada et al. ......................... 382/8 |

OTHER PUBLICATIONS

WO81/01764, Robert J. Thomas et al., "Document Reader", Jun. 25, 1981.
WO83/01853, Ram Nath Sahni, "Image Capturing Apparatus", May 26, 1983.

Primary Examiner—Leo H. Boudreau
Assistant Examiner—Donald J. Daley
Attorney, Agent, or Firm—Spencer & Frank

[57] ABSTRACT

A method and apparatus for processing an embossed card on which embossed characters are formed. The apparatus performing the method by optically reading embossed characters and producing corresponding electrical signals. The produced corresponding electrical signals are then compared with characteristic data of a predetermined set of characters. From this comparison, identification of the embossed characters is determined.

16 Claims, 6 Drawing Sheets

METHOD AND APPARATUS FOR PROCESSING EMBOSSED CARD

BACKGROUND OF THE INVENTION

This invention relates to a method and apparatus for processing embossed cards such as bank cards, medical examination cards, and the like on which characters are embossed.

Embossed cards such as bank cards, medical examination cards, membership cards and the like on which characters (letters, marks and the like) recorded in the form of embossment have been widely known.

Data recorded on such embossed cards include a personal name, a registration number, birth date and sex. These data may be used for example to identify the person who holds it. For example, at a hospital, a patient is required to submit an examination card when he visits the hospital for consultation and when he submits the card, the clerk at the hospital transfers the data onto a slip or the like. If the slip is formed of a pressure sensitive paper, such transfer can be effected by placing the slip on the embossement, and applying a pressure by means of a roller. This method of transfer eliminates the need of transfer by writing or by manipulation of a keyboard which is inherently associated with the risk of clerical error.

However, once the information has been transferred from the card onto a slip, the card is returned to the patient and further transfer of the information to other papers such as an accounting sheet had to be effected by handwriting or by use of a keyboard. This is timeconsuming and is susceptible to errors. Moreover, the information thus transferred by use of a pressure sensitive paper cannot readily be used for further processing and does not facilitate further reliable reproduction.

SUMMARY OF THE INVENTION

An object of the invention is to enable conversion of embossed characters into electrical signals thereby to permit further processing and reproduction of information.

Another object of the invention is to enable conversion of embossed characters into digital code thereby to permit exchange of data with other data processing devices.

A further object of the invention is to enable accurate reading of embossed characters even when the embossed card has print or smears on its surface.

According to one aspect of the invention, there is provided an apparatus for processing an embossed card on which embossed characters are formed, the apparatus comprising an optical reader, including a photoelectric conversion element, for reading the embossed characters to produce electrical signals, a characteristic data memory for storing characteristic data of predetermined set of characters, and identification unit for comparing the electrical signals from the optical reader with the characteristic data stored in the characteristic data memory, to identify the embossed characters. The apparatus may be further provided with a code memory for storing character codes representing the identified characters and a transmitter for transmitting the character codes to a recording or displaying unit.

According to another aspect of the invention, there is provided a method of processing an embossed card on which embossed characters are formed, the method comprising the steps of illuminating the embossed characters from different oblique directions, separately picking up the images due to the illumination from the two different directions to obtain electrical signals representing the two images, determining the difference of the electrical signals representing the two images thereby to create electrical signals representing an image of shadows formed along the edges of the embossed characters due to the illumination from the two different directions. The method may further comprise the step of converting the electrical signals representing the image of the shadows into binary signals.

According to a further aspect of the invention, there is provided a method of processing an embossed card on which embossed characters are formed, the method comprising the steps of illuminating dents at the back of the embossed characters, and picking up the image including shadows formed at the dents due to the illumination to produce electrical signals representing the image.

DETAILED DESCRIPTION OF THE INVENTION

An embodiment of embossed card processing apparatus according to the invention will now be described with reference to the drawings.

Figure 1A:
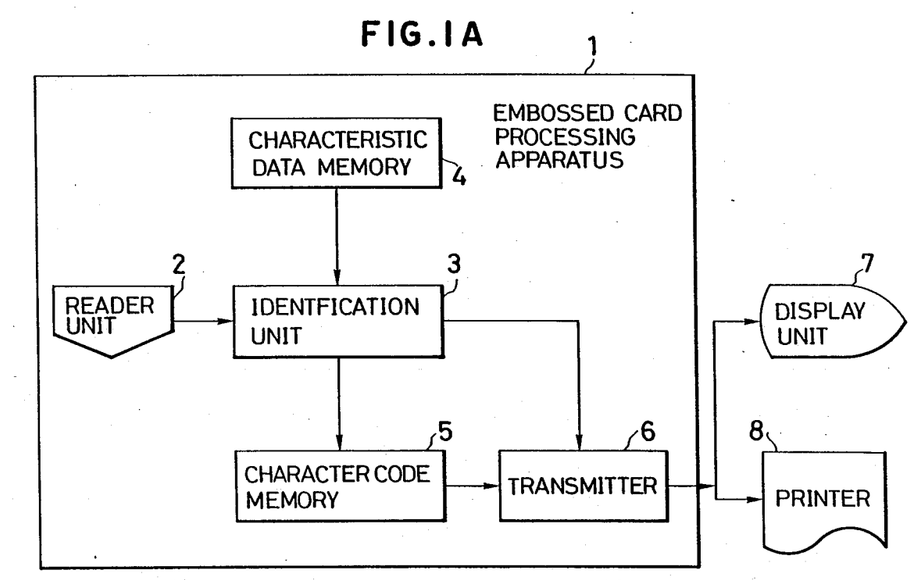
FIG. 1A is a block diagram of an embossed card processing apparatus according to this invention.

FIG. 1A shows a part of the embossed card processing apparatus according to the invention which comprises a reader unit 2 for reading embossed characters (letters, marks and the like) formed on an embossed card that has to be processed.

The reader unit 2 comprises an optical means, to be described later, for picking up the image of the embossed characters to produce electrical signals representing the image. The signals are made into binary signals which are then compared with characteristic data of a set of embossed characters stored in a characteristic data memory 4. In accordance with the result of comparison, the embossed characters are identified and the character codes representing the identified characters are derived and stored in a character code memory 5.

The outputs of the identification unit 3 and the character code memory 5 are fed to a transmitter 6, which outputs the selected one of its input to a display unit 7 or a printer 8 connected to the apparatus 1.

Figure 2:
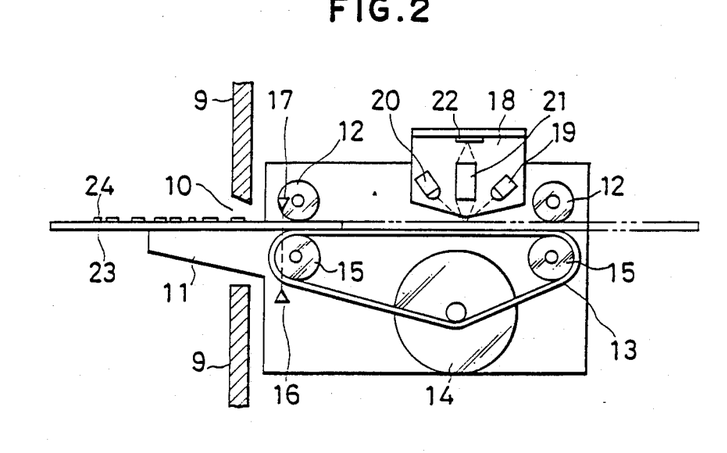
FIG. 2 is a schematic side view of an embossed card reader unit of the apparatus shown in FIG. 1.

FIG. 2 shows a side view of an example of the reader 2 which comprises a front panel 9 and a guide member 11 projecting horizontally outwardly through an opening 10 of the front panel 9. An embossed card 23 to be processed is placed on the guide member 11.

The embossed card 23 placed on the guide member 11 is guided into the body of the reader 2 by the action of the conveyor rollers 12 and 15 which are disposed opposite to each other with respect to the card passage extending from the guide member 11. The rollers 15 are driven by an electric motor 14 in forward and reverse directions and a conveyor belt 13 is run on the rollers 15 to convey the embossed card 23. In a preferred embodiment, the conveyor rollers 12 and 15 may be made of a high fraction materials such as rubber.

The embossed card 23 with embossed characters 24 on the front surface thereof is guided through the opening 10 with the front surface facing upward. A light emitting diode 16 is located inside of the front panel 9 near the opening 10 and below the embossed card passage and a light receiving transistor 17 is located above the embossed card passage opposite to the light emitting diode 16 to receive light from it. When an embossed card 23 is passed the light from the light emitting diode 16 to the light receiving transistor 17 is interrupted.

An image sensor 18 is located above the embossed card passage between the rollers 12. The image sensor 18 comprises a pair of light emitting diode (LED) arrays 19 and 20 each comprising a plurality of light emitting diodes. The LED arrays 19 and 20 are positioned to illuminate the embossed characters from two different directions at predetermined oblique angles. In the illustrated example the angles of illumination are identical to each other. Disposed between the LED arrays 19 and 20 is a light collector 21 preferably comprising an array of SELFOC lenses. A light passing through the light collector 21 is focused on a light receiving element 22 of a photo-electric converter. The light receiving element may comprise amorphous silicon sensor.

An embossed card processing method implemented by use of the apparatus constructed as described above will be described next.

The embossed card with the embossed characters directed upward is placed on the guide member 11 and slid through the opening 10 into the reader 2 and conveyed horizontally along the embossed card passage by means of the rollers 12 and the belt 13 driven by the electric motor 14. The insertion of the embossed card 23 is detected by the light receiving transistor 17.

The embossed characters 24 of the embossed card 23 conveyed into the reader 2 are read by means of the image sensor 18 and electrical signals representing the embossed characters are produced.

Figure 3:
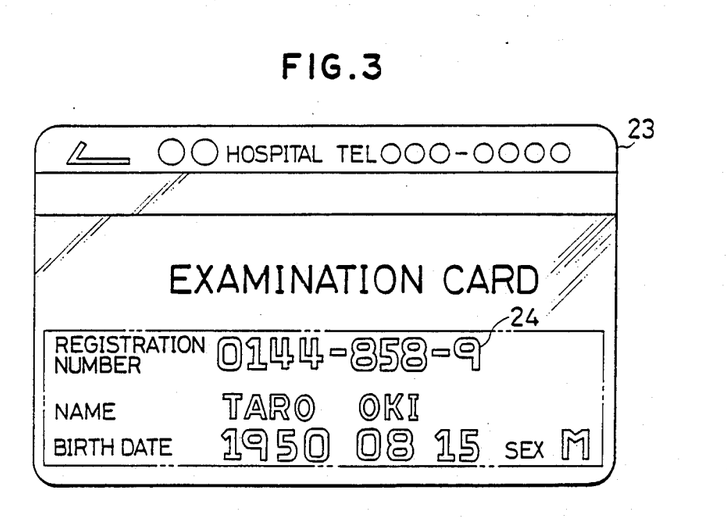
FIG. 3 is an example of an embossed card which is a medical examination card to be processed by the apparatus shown in FIG. 1.

FIG. 3 is a plan view of the medical examination card, taken as an example of embossed card 23 on which are formed embossed characters "0144-858-9", "TARO OKI", "1950 08 15", and "M" which respectively represent registration number, name, birth date, and sex distinction of a patient.

Figure 4A:
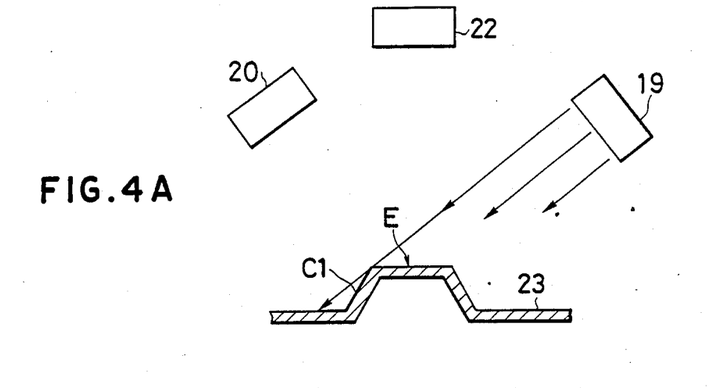
FIGS. 4A and 4B show how shadows are formed by the edges of embodiment.
Figure 4B:
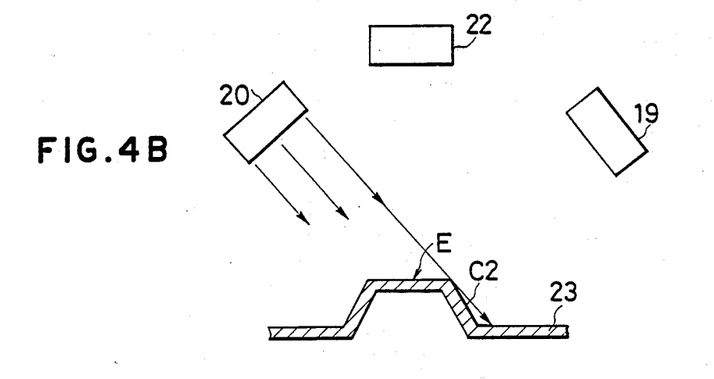

FIG. 4A shows how a shadow C1 is formed by an embossment E when it is illuminated by a first LED array 19. FIG. 4B shows how a shadow C2 is formed by an embossment E when it is illuminated by a second LED array 20. To the light receiving element 2 the shadows C1, C2 are seen as dark part of the image as are dark parts of prints and smears. As a result, the resultant image as seenby the light receiving element 22 in each case of FIG. 4A and FIG. 4B is as shown in FIG. 5A. and FIG. 5B.

Figure 5A:
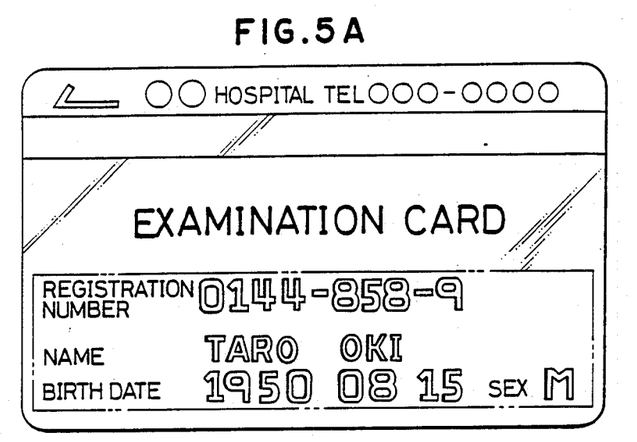
FIG. 5A and 5B show images formed by illumination from two oblique directions.
Figure 5B:
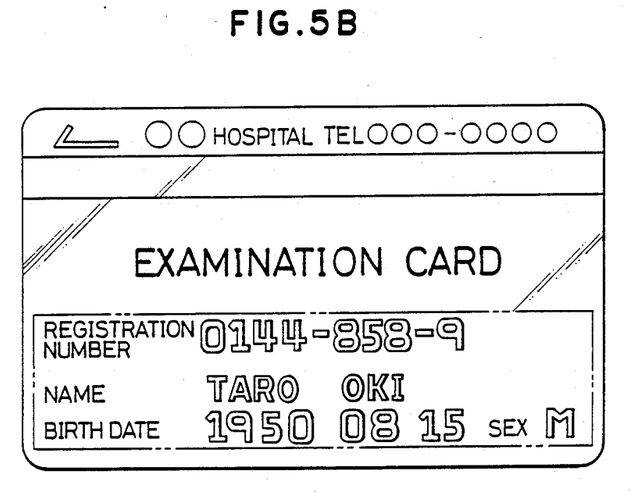

The LED arrays 19 and 20 are turned on alternately and in synchronism therewith the light receiving element 21 sees the images of FIG. 5A and 5B alternately.

Figure 4C:
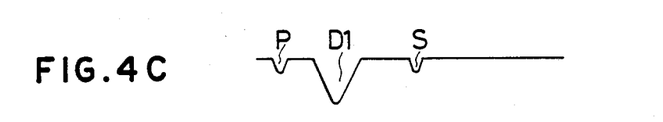
FIGS. 4C through 4E are diagrams showing how electrical signals representing the images including shadows by the edges of embossment.
Figure 4D:
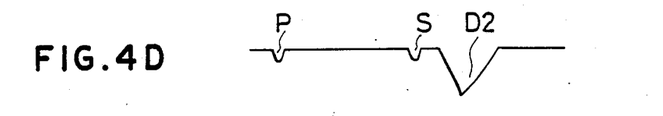
Figure 4E:
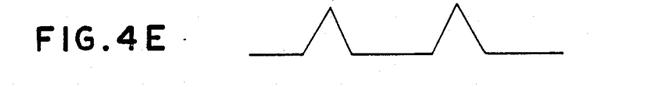

FIG. 4C and FIG. 4D respectively show signals obtained when the images of FIG. 5A and 5B having shadows of FIG. 4A and 4B, respectively, are scanned. In FIG. 4C and FIG. 4D, the shadows C1 and C2 are reflected as depressions D1 and D2, respectively. In FIG. 4C and FIG. 4D, effects of print (P) and smear (S) are also shown. FIG. 4E shows the absolute value of the difference between the signals of FIG. 4C and FIG. 4D.

As described earlier, the LED arrays are alternately turned on and signals of FIG. 4C and FIG. 4D are alternately produced and the absolute value of the difference between the signals of FIG. 4C and FIG. 4D produced successively is determined.

Figure 1B:
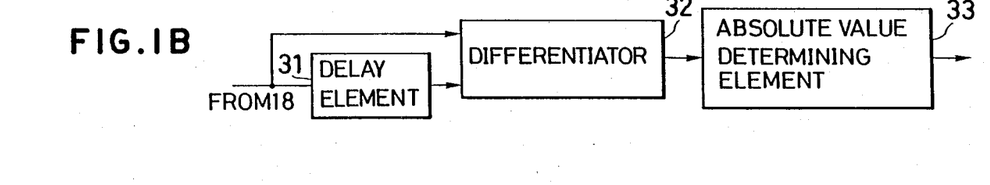
FIG. 1B is a block diagram showing part of a reader unit.

These operations can be accomplished by a delay element 31 receiving the output of the image sensor 18 and having a delay time corresponding to scanning of one line, and a differentiator 32 receiving and determining the difference between the output of the image sensor 18 and the output of the delay element 31, and an absolute value determining element 33 determining the absolute value of the output of the differentiator 32.

The effects of print (P) or smear (S) are eliminated because they appear equally in the signals of FIG. 4C and FIG. 4D and they cancel each other through differentiation.

Although the card travels a certain distance between successive productions of the signals of FIG. 4C and 4D, such a distance is negligible if the alternate illumination and the alternate production of the signals are performed at a sufficiently high frequency compared with the speed of the card.

After the optical reading, the rollers 15 and belt 13 are driven in the reverse direction so that the card 23 is moved back through the opening 10 onto the guide 11, permitting return to the holder.

Figure 5C:
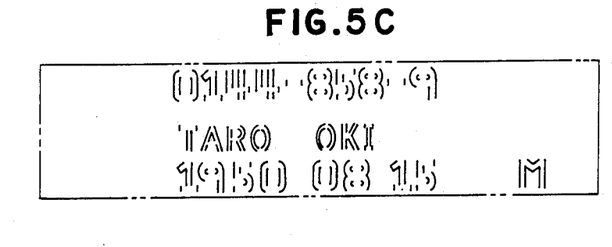
FIG. 5C is a diagram showing part of an image obtained by synthesis of the two images of FIGS. 5A and 5B.

The signals of FIG. 4E representing the image of FIG. 5C are supplied to the identification unit 3 where they are compared with characteristic data of a set of characters for identification. The results of the identification i.e., character codes, are stored in the character code memory 5.

The character codes can be supplied to the display unit 7 or the printer 8 through the transmitter 6.

Figure 6:
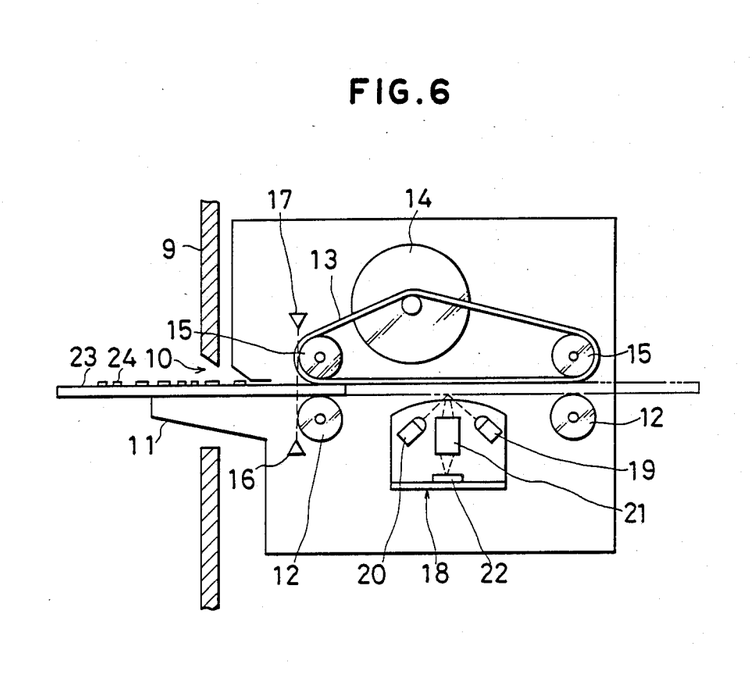
FIG. 6 is a schematic side view of another example of the embossed card reader unit used for implementing a method of the invention.
Figure 7:
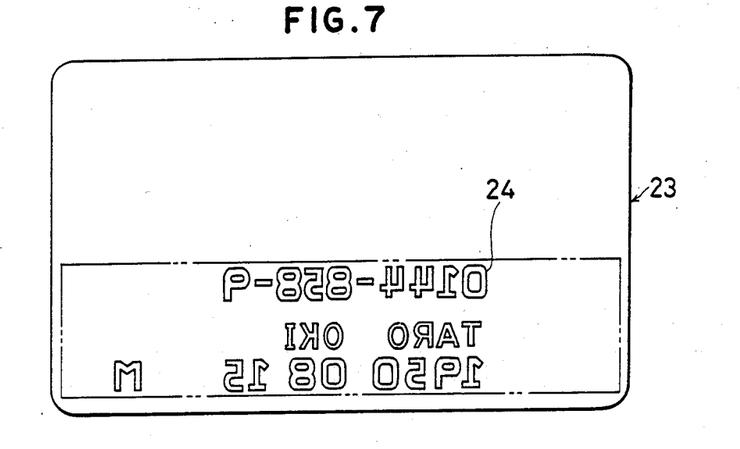
FIG. 7 shows a rear surface of the embossed card such as shown in FIG. 3.

In the above embodiment, the front surface having embossment (protrusions) of the embossed card is illuminated and images of the embossed characters on the front surface are picked up and used for processing. In another embodiment shown in FIG. 6 images of the rear surface including dents formed at the back of the embossment are picked up and used for processing. Planar patterns of such dents correspond to the embossed characters. More particularly, the patterns of characters are reversed: right side to left, as shown in FIG. 7. But this does not affect the essence of the signal processing. In the embodiment of FIG. 6, the image sensor 18 is disposed below the card passage to illuminate and see the rear surface of the card.

When the rear surface with dents are illuminated, shadows are formed in the dents and they form dark part in the image. The darkness is more intense than in the case of shadows formed by the edges of the embossment.

Figure 8:
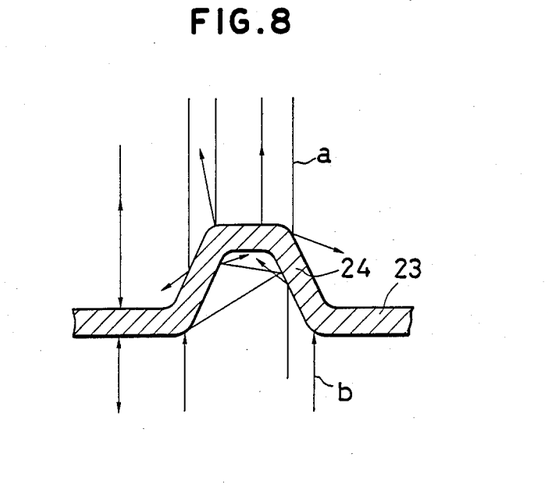
FIG. 8 is a cross sectional view in an enlarged scale of a part of an embossement to explain the reading by the reader unit shown in FIG. 6.

FIG. 8 shows how incident light is "absorbed" in the dents, through repeated reflections on the walls of the dents. In FIG. 8, it is assumed that light is incident at right angles to the surface. When the front surface is illuminated in the same way, light scatters on the top and side surfaces of the embossment, making it difficult to produce shadows, and hence dark parts in the image.

The signals obtained by use of the image sensor shown in FIG. 6 can be processed in a manner similar to that described in connection with the embodiment of FIGS. 1 to 5.

In the above-described embodiments two arrays of LEDs are used for illumination of the card. But alternatively, a single array of LEDs may be used in place of the two arrays.

According to the invention, the embossed characters are optically read out and electronically processed and coded, so that the thus obtained character codes can supplied to a display unit for display or a printer for printing. It also enables on-line processing of the coded data. Thus, the versatility of the system is expanded. In addition, when the embossed card is illuminated from two different directions and signals of the images produced by the illumination form the two different directions, are differentiated signals free from the influence of the print and smears can be obtained, so that more accurate reading of the embossment and recognition of characters can be achieved.

What is claimed is:

1. Apparatus for processing an embossed card on which embossed characters are formed, said apparatus comprising:
   a pair of light emitting diode arrays arranged to illuminate an embossed card alternately from two oblique directions opposite to each other;
   a light collector disposed between said pair of light emitting diode arrays for collecting the light reflected from said embossed card;
   means for receiving the collected light and converting said received light into two series of electrical signals;
   means for differentiating said two series of electrical signals to produce pattern data representing embossed characters;
   character data storage for storing characteristic data of a predetermined set of characters; and
   means responsive to said means for differentiating and said character data storage for identifying said embossed characters.

2. The apparatus according to claim 1, wherein said external device is a printer.

3. The apparatus according to claim 1, wherein said external device is a display unit.

4. The apparatus according to claim 1, further comprising:
   means for transmitting codes representing said identified embossed characters to an external device.

5. Apparatus for processing an embossed card on which embossed characters are formed, said apparatus comprising:
   a light source for illuminating an embossed card with a light from two oblique directions opposite to each other such that shadows are formed at the embossment;
   optical reading means for optically reading the shadows at the embossment and producing electrical signals;
   character data storage means for characteristic data of a predetermined set of characters; and
   identifying means, receiving the outputs from said optical reading means and said character data storage means, for determining the difference between the electrical signals representing the shadows due to the illumination from the two directions and for identifying said embossed characters.

6. The apparatus according to claim 5, wherein said optical reading means includes means for receiving the light from said embossed card and converting the light received into two series of electrical signals; and
   said identifying means includes a differentiating means for differentiating the two series of electrical signals to produce pattern data representing said embossed characters, and identifying said embossed characters on the basis of the result of a comparison of the differentiating with the data stored in said character data storage means.

7. The apparatus according to claim 5, wherein said light source has a pair of light emitting diode arrays arranged to illuminate said embossed card from the two opposite directions.

8. The apparatus according to claim 7, further comprising:
   a light collector disposed between said pair of light emitting diode array for collecting the light reflected from said embossed card.

9. The apparatus according to claim 7, wherein said pair of light emitting diode arrays are arranged to illuminate said embossed card alternately; and
   said identifying means includes a differentiating means for differentiating the two series of electrical signals to produce pattern data representing said embossed characters.

10. The apparatus according to claim 6, wherein said optical reading means includes an image sensor for reading the shadows at the embossment;
    said identifying means includes a delay element for receiving the output of said image sensor and having a delay time corresponding to a scanning; and
    said differentiating means receives and determines the difference between the output of said image sensor and the output of said delay element to produce an absolute value determining element which represents the absolute value of the output of said differentiating means.

11. The apparatus according to claim 5, further comprising:
    means for conveying said embossed card past said light source and said light receiving means, wherein the alternating illumination by said pair of light emitting diode arrays has a frequency sufficiently high as compared with the speed of the conveyance of said embossed card on said conveyor means.

12. The apparatus according to claim 6, further comprising:
    a housing for accommodating said light source and said means for receiving said light, said housing having an opening for permitting insertion and ejection of said embossed card; and means for conveying said embossed card through said opening and past said light source and said light receiving means.

13. The apparatus according to claim 12, wherein said means for conveying comprises a pair of rollers and a conveyor belt which runs on the rollers.

14. The apparatus according to claim 12, wherein said means for conveying moves said embossed card backward through said opening permitting return of said card to a holder after completing the reading of said embossed characters.

15. The apparatus according to claim 5, further comprising means for detecting the insertion of said embossed card through said opening.

16. A method of processing an embossed card on which embossed characters are formed, comprising the steps of:

alternately illuminating from two opposite oblique directions of a front surface of the embossed card and collecting light reflected therefrom to form images due to illumination from two different directions; and differentiating the images to produce signals representing shadows by the edges of embossment.

* * * * *